(12) United States Patent
Zhu et al.

(10) Patent No.: US 8,970,632 B2
(45) Date of Patent: Mar. 3, 2015

(54) SYSTEMS AND METHODS FOR TEMPORARY DISPLAY OF MAP DATA STORED IN A DISPLAY DEVICE HIGH SPEED MEMORY

(75) Inventors: Ronghui Zhu, Sunnyvale, CA (US); Michael Siliski, San Francisco, CA (US)

(73) Assignee: Google Inc., Mountain View, CA (US)

( * ) Notice: Subject to any disclaimer, the term of this patent is extended or adjusted under 35 U.S.C. 154(b) by 289 days.

(21) Appl. No.: 13/494,678

(22) Filed: Jun. 12, 2012

(65) Prior Publication Data
US 2013/0147842 A1      Jun. 13, 2013

Related U.S. Application Data

(60) Provisional application No. 61/569,488, filed on Dec. 12, 2011.

(51) Int. Cl.
*G09G 5/00* (2006.01)
*G06F 3/01* (2006.01)

(52) U.S. Cl.
CPC ..................... *G06F 3/013* (2013.01)
USPC ........... 345/660; 345/636; 345/667; 701/411; 701/432; 702/5

(58) Field of Classification Search
CPC .............. G09G 2340/0407; G09G 2340/0414; G09G 2340/0421; G06T 3/40; G06F 3/0481

USPC ........ 345/660, 636, 667; 701/411, 432; 702/5
See application file for complete search history.

(56) References Cited

U.S. PATENT DOCUMENTS

| | | | |
|---|---|---|---|
| 7,269,510 B2* | 9/2007 | Persson ......................... | 701/532 |
| 8,126,276 B2* | 2/2012 | Bolle et al. ................... | 382/232 |
| 8,212,835 B1* | 7/2012 | Migdal et al. ................. | 345/587 |
| 8,223,172 B1* | 7/2012 | Miller et al. .................. | 345/660 |
| 2002/0135794 A1* | 9/2002 | Rodriguez et al. ........... | 358/1.15 |
| 2002/0158908 A1* | 10/2002 | Vaajala et al. ............... | 345/767 |
| 2005/0147442 A1* | 7/2005 | Walker et al. .................. | 400/76 |
| 2009/0055776 A1* | 2/2009 | Audet .......................... | 715/835 |
| 2010/0250120 A1* | 9/2010 | Waupotitsch et al. ........ | 701/207 |
| 2010/0321399 A1* | 12/2010 | Ellren et al. ................. | 345/587 |

* cited by examiner

*Primary Examiner* — Xiao M. Wu
*Assistant Examiner* — Todd Buttram
(74) *Attorney, Agent, or Firm* — Marshall, Gerstein & Borun LLP (57) ABSTRACT

The present disclosure relates to temporarily rendering a display on a display device using map data stored in a high speed memory of the display device while the display device is waiting to receive updated data from a display device persistent memory or a remote map data database in response to a user initiated request for updated data. The present disclosure also relates to a display device high speed memory management module for managing the contents of a high speed memory.

19 Claims, 7 Drawing Sheets

SYSTEMS AND METHODS FOR TEMPORARY DISPLAY OF MAP DATA STORED IN A DISPLAY DEVICE HIGH SPEED MEMORY

CROSS REFERENCE TO RELATED APPLICATIONS

The present application claims benefit under 35 U.S.C. §119(e) to U.S. provisional patent application Se. No. 61/569,488, filed Dec. 12, 2011, the entire disclosure of which is incorporated herein by reference.

FIELD OF THE DISCLOSURE

The present disclosure relates to display of digital map data on a display device. More specifically, the present disclosure relates to systems and methods to temporarily render a display on a display device using map data that was stored in a high speed memory of the display device prior to a user requesting updated data, while the display device simultaneously executes the user initiated request.

BACKGROUND

With the widespread use of mobile devices, such as mobile phones, personal data assistants, tablet personal computers, etc., consumer demand for access to varied types of data continues to grow at a high rate. These devices are commonly used to transmit, receive, and store text, voice, image and video data. While consumers have come to desire fast access to data, the sheer amount of data required to support many software applications places a premium on data management, both at the client device level and at the network level. This premium limits the effectiveness of software applications such as mapping applications, which typically require comparatively large amounts of network data and a significant amount of memory and processing.

Mapping applications are found in a variety of non-portable computing devices, such as desktop computers, as well as in mobile devices, including car navigation systems, hand-held global positioning system (GPS) units, mobile phones, and portable computers. Mapping applications are among the most frequently used software applications and are considered, by some, necessary for personal safety. Although the underlying digital maps are easy to use from a user's perspective, rendering a digital map image on a display device is a data intensive process.

Geographic maps, for example, begin with a set of raw data corresponding to aerial photographs of the earth having millions of overlaying roadways and related location based information labels. The raw map data is derived from a variety of sources, each source providing different amounts and types of information. Effectively mapping a location or region, locating a driving route between a source and a destination, identifying points of interest, etc. requires substantial amounts of data transfer and data processing. Furthermore, many mapping applications require display of different map data at different zoom levels where the amount of detail and features of that detail changes at each zoom level. For example, at a lowest zoom level, scaled farthest away from a target, the map data may contain the boundaries of continents, oceans, and major landmasses with relatively little detail. At subsequent zoom levels, the map data may identify countries, states, homelands, protectorates and other major geographic regions. While at even further subsequent zoom levels, the map data may contain major roads, cities, towns, until eventually the map data contains a relatively large amount of detail including minor roads, buildings, down to even sidewalks and walk ways depending on the region. Information labels providing links to location based services are often incorporated within the map data at higher zoom levels. The amount of detail is determined by the sources of information used to compile the map data at each zoom level. No matter the zoom level, the amount of data is voluminous and generally too large for storage, in total, on mobile client devices and too large for continuous download over a wireless communication network.

Providing a user with the experience of smooth transitions between map images when using the zoom and pan functions within a map application is challenging. Display generation delay during map image transitions is undesirable.

SUMMARY

A method for displaying maps on a display device is provided, the display device having a first memory, a second memory and a user interface, wherein a first access speed of the first memory is higher than a second access speed of the second memory. The display device operates in a communication network. The method includes receiving a user request, via the user interface, to display a requested map image corresponding to a requested geographic region and a requested zoom level. The method further includes, determining that map data required to generate the requested map image is unavailable in the first memory and generating a temporary display of a selected map image in response to determining that the required map data is unavailable in the first memory and selecting, from the first memory, map data representative of a selected map image corresponding to a selected geographic region and a selected zoom level, wherein the selected geographic region encompasses the requested geographic region and wherein the selected zoom level is different than the requested zoom level and generating the temporary display of the selected map image using the selected map data. The method further includes, retrieving the map data required to generate a display of the requested map image from the second memory or a remote server operating in the communication network in response to the user request and displaying the temporary display on the user interface at least while the map data required to generate a display of the requested map image is being retrieved.

In another embodiment, a display device for displaying maps is provided, the display device having a first memory, a second memory and a user interface, wherein a first access speed of the first memory is higher than a second access speed of the second memory. The display device is operating in a communication network. The display device includes a mapping module stored on the second memory that, when executed on a processor receives a user request via the user interface to display a requested map image corresponding to a requested geographic region and a requested zoom level. The display device further includes a map data selection and display rendering module stored on the second memory that, when executed on a processor determines if map data required to generate a display of the requested map image is in the first memory. The map data selection and display rendering module generates a temporary display of a selected map image based on an outcome of determining if the required map data is in the first memory. The map data selection and display rendering module selects map data from the first memory representative of a selected map image corresponding to a selected geographic region and a selected zoom level, wherein the selected geographic region encompasses the requested geographic region and the selected zoom level is different than the requested zoom level. The map data selection and display rendering module generates the temporary display of the selected map image using the selected map data. The display device further includes a map data interface module stored on the second memory that, when executed on a processor retrieves the map data required to generate a display of the requested map image from a memory other than the first memory in response to the user request. The map data selection and display rendering module displays the temporary display on the user interface at least while the map data required to generate a display of the requested map image is being retrieved.

In yet another embodiment, a computer-readable medium storing instructions for displaying maps on a display device is provided, the display device having a first memory, a second memory and a user interface, wherein a first access speed of the first memory is higher than a second access speed of the second memory. The display device is operating in a communication network. The computer-readable medium includes a mapping module stored on the computer-readable medium that, when executed on a processor receives a user request via the user interface to display a requested map image corresponding to a requested geographic region and a requested zoom level. The computer-readable medium further includes a map data selection and display rendering module stored on the computer-readable medium that, when executed on a processor determines if map data required to generate a display of the requested map image is in the first memory. The map data selection and display rendering module generates a temporary display of a selected map image based on an outcome of determining if the required map data is in the first memory. The map data selection and display rendering module selects map data from the first memory representative of a selected map image corresponding to a selected geographic region and a selected zoom level, wherein the selected geographic region encompasses the requested geographic region and the selected zoom level is different than the requested zoom level. The map data selection and display rendering module generates the temporary display of the selected map image using the selected map data. The computer-readable medium further includes a map data interface module stored on the computer-readable medium that, when executed on a processor retrieves the map data required to generate a display of the requested map image from a memory other than the first memory in response to the user request. The map data selection and display rendering module displays the temporary display on the user interface at least while the map data required to generate a display of the requested map image is being retrieved.

In yet a further embodiment, a method for displaying maps on a display device is provided, the display device having a first memory, a second memory and a user interface, where a first access speed of the first memory is higher than a second access speed of the second memory. The display device operates in a communication network. The method includes receiving a user request, via the user interface, to display a requested map image corresponding to a requested geographic region and a requested zoom level. The method further includes determining that map data required to generate the requested map image is unavailable in the first memory and generating a temporary display of a selected map image in response to determining that the required map data is unavailable in the first memory. To this end, the method includes selecting, from the second memory, map data representative of a selected map image corresponding to a selected geographic region and a selected zoom level, where the selected geographic region encompasses the requested geographic region and where the selected zoom level is different than the requested zoom level, and generating the temporary display of the selected map image using the selected map data. The method further includes retrieving the map data required to generate a display of the requested map image from the second memory or a remote server operating in the communication network in response to the user request and displaying the temporary display on the user interface at least while the map data required to generate a display of the requested map image is being retrieved.

The features and advantages described in this summary and the following detailed description are not all-inclusive. Many additional features and advantages will be apparent to one of ordinary skill in the art in view of the drawings, specification and claims hereof.

DETAIL DESCRIPTION

The present disclosure describes systems and methods related to display devices that provide a user with an experience that map images are available for immediate display upon request. Often times, a user of a display device will begin interacting with a map application by requesting display of a particular map image defined by a geographic region and a corresponding zoom level. Typically, the initial geographic region encompasses more than one point of interest. The user will then zoom in to one of the points interest to view more detail. Subsequently, the user may wish to pan beyond the bounds of the geographic region associated with the first point of interest to view detail related to another point of interest that was included in the previously viewed region. Providing smooth transitions between the associated displays is desirable.

As a more specific example, a user will request display of a first map image representative of a first geographic region (e.g. Northern California, depicting general information such as the Pacific Coast, State boundaries, highways and major cities, such as San Francisco and Sacramento, for example) associated with a first zoom level. The user may then request display of a second map image, via a "zoom" user control, representative of a second geographic region (e.g. San Francisco, for example, depicting local roadways and local attractions) which is encompassed within the first geographic region. The second map image in this scenario is associated with a second zoom level which is higher than the first zoom level. Subsequently, the user may request display of a third map image, via a "pan" or "fly-over" user control, representative of a third geographic region (e.g. Sacramento, for example, depicting local roadways and local attractions) which is not encompassed within the second geographic region. However, the third geographic region, similar to the second geographic region, is encompassed within the first geographic region and may have a zoom level equal to the second zoom level. The systems and methods described in the present disclosure store map data associated with the first geographic region within a display device high speed memory (e.g. random access memory (RAM), for example) and retain this map data within the high speed memory while the subsequent map images are being viewed. When the user requests display of the third geographic region, a temporary display is generated using at least a portion of the map data that is stored in the display device high speed memory associated with the first geographic region, even though this map data is associated with a zoom level that is different than the zoom level associated with the requested third geographic region. For reasons described in detail herein, generating a display using the map data stored in the display device high speed memory requires less time than retrieving the requested map data and then generating a display using the requested map data.

More generally, the present disclosure describes systems and methods for temporarily generating a display on a display device using map data that was stored in a high speed memory of the display device prior to receiving a user request for updated map data. A display device is configured to receive user requests for display of specific map data via a user interface. The user identifies points of interest or a region of interest along with the desired zoom level at which the map image is to be displayed. In response to receiving the user request for updated map data, the display device generates a temporary display using map data that was previously stored in the high speed memory. The temporary display is maintained for a period of time while the display device executes the user initiated request. Once the updated map data is received at the display device, a display is generated using the updated map data replacing the temporary display.

In circumstances when a user requests a map image display that was previously displayed, the map data associated with the requested map image may be available in the display device high speed memory. When the requested map data associated with the requested map image display is available in the display device high speed memory, a display is rendered using that data. More often, the map data associated with the requested map image display will reside in a low-speed memory (e.g., persistent memory such as a disk or a flash memory) of the display device or may reside on a remote map database server. When the requested map data is not available in the display device high speed memory, a determination is made as to what map data available in the display device high speed memory encompasses the requested map data. For example, map data may be stored in the display device high speed memory that includes the points of interest or region identified by the user; however, the zoom level associated with the map data stored in the high speed memory is different than that specified by the user. A temporary display is generated using the map data stored in high speed memory by expanding or shrinking the associated map image to fit the corresponding display area. Thereby, corresponding mapping applications temporarily display a map image using map data stored in the display device high speed memory, as opposed to displaying blank, or grey, spaces while the user initiated request for updated map data is being executed. Generation of the temporary display provides the user with the impression that the requested map data is readily available.

The terms "high speed memory" and "low-speed memory" are used in the present disclosure to emphasize the fact that the respective memories provide access to stored data at different speeds relative to each other. Neither the high speed memory nor the low speed memory thus needs to have high or low speed, respectively, in absolute terms. Rather, the high speed memory provides a higher read speed (and, in some cases, also a higher write speed) as compared to the low speed memory.

The high speed memory and the low speed memory typically represent separate structures within a given display device. In some implementations, the high speed memory is a volatile memory, while the low speed memory is a non-volatile, or persistent memory. For example, the high speed memory may be implemented in RAM, and the low speed memory may be implemented in a flash memory or on a disk. Accordingly, the low speed memory may have different specifications in addition to access speed when compared to specifications for the high speed memory. For example, the low speed memory may provide for storage of large amounts of data when compared to the storage capacity provided in the high speed memory.

In some cases, the high speed memory and the low speed memory have similar composition but different connectivity to the one or more processors of the display device. For example, in one implementation, each of the high speed memory and the low speed memory is be implemented in RAM, but the high speed memory is provided on-chip and uses an internal communication bus for data transfer, while the low-speed memory is provided off-chip and uses an external communication bus for data transfer.

More generally, the low speed memory functions differently within the display device when compared to the function of the high speed memory. For example, vector based map data may be stored in the low speed memory while raster based map data may be stored in the high speed memory. Further, from the perspective of a software application executing on the display device (such as a map application), communication between a processor and a persistent memory may be implemented using different programming functions than the programming functions used for communication between a processor and a high speed memory. For example, the software application may declare variables and dynamically allocate chunks of memory in the high speed memory; however, to access data in the low speed memory, the software application may invoke functions for interacting with files (e.g., open file, read file, etc.).

Figure 1:
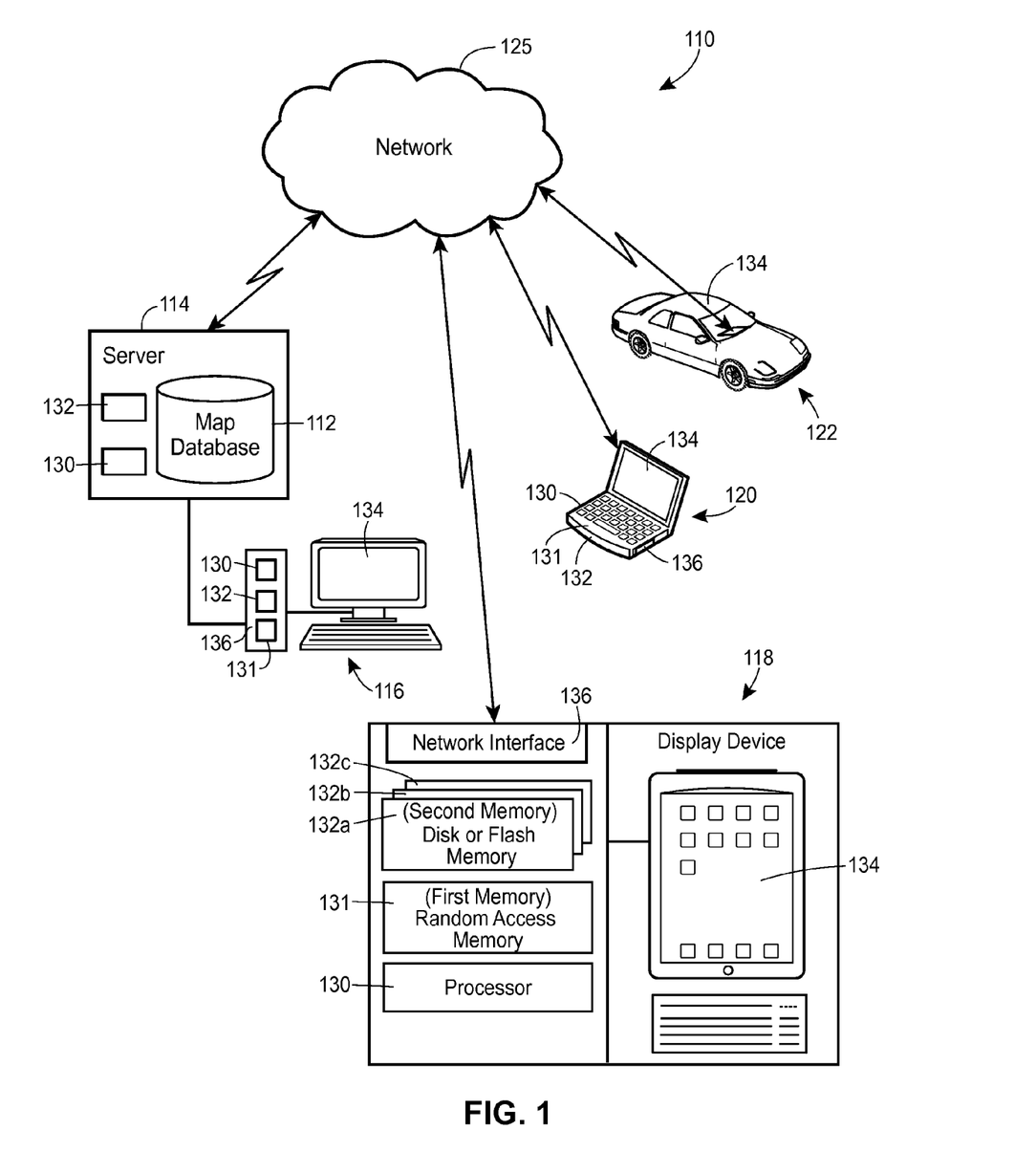
FIG. 1 depicts a high-level block diagram of a computer network including a server containing map data for selectively communicating that map data to various display devices on the network.

FIG. 1 depicts a high-level block diagram that illustrates a computing environment for a map data system 110 that provides the desired user experience. As illustrated in FIG. 1, the map data system 110 includes a map database 112 connected to or disposed within a remote server 114, which, in turn, is connected to a number of display devices 116-122. The network 125 includes, but is not limited to any combination of a LAN, a MAN, a WAN, a mobile, a wired or wireless network, a private network, or a virtual private network. While only four display devices 116-122 are illustrated in FIG. 1 to simplify and clarify the description, it should be understood that any number of display devices are supported and may be in communication with the remote server 114.

Both the server 114 and the display devices 116-122 are computer devices that may include one or more processors such as a central processing unit (CPU) 130, one or more high speed memories 131, one or more low speed memories 132, 132a, 132b, 132c, one or more user interface devices 134 (keyboard, touch screen, etc.), a network interface 136 and one or more peripheral interfaces, along with other well known components. As is known to one skilled in the art, other types of computers may be used as display devices that have different architectures than those depicted in FIG. 1. The display devices 116-122 represent any suitable computer device, such as a desktop device, a handheld and/or mobile device, such as a mobile phone, personal data assistant, laptop computer, tablet personal computer, car navigation system, or hand-held GPS unit. More broadly, the display devices 116-122 represent any personal computing device, server, or network of such devices, or any other processing device having a user interface and CPU and capable of displaying a visual rendering of map data. Furthermore, while in some examples, the network 125 is described as a wireless network, the network 125 may be any wired or wireless network, where the display devices 116-122 are communicatively coupled to the network 125.

The server 114 and the display devices 116-122 are also adapted to execute modules for providing the desired functionality. As used herein, the term "module" refers to circuitry and or computer program logic used to provide the specified functionality. Thus, a module may be implemented in hardware, firmware, and/or software. Modules may be stored on a storage device, loaded into memory and executed by a processor or can be provided from computer program products that are stored in tangible computer-readable storage mediums (e.g. RAM, hard disk, flash, optical/magnetic media, etc.).

The map database 112, which may be stored in, or may be separate from the server 114 contains map data that is used to generate a display of a map image or that may be used by, for example, a navigation system to determine routes between two locations. Physical roads, waterways, parks, landmarks, and other geographic elements may be represented in the map data. In some cases, the map data stored in the map database 112 may be obtained from several different sources such as the New York City Open Accessible Space Information System (OASIS) and the U.S. Census Bureau Topologically Integrated Geographic Encoding and Referencing system (TIGER). The map database 112 does not need to be physically located within the server 114. For example, the database 112 may be stored in external storage attached to the server 114, or may be stored in a network attached storage. Additionally, there may be multiple servers 114 that connect to a single database 112. Likewise, the map database 112 may be stored in multiple different or separate physical data storage devices. For example, the map data may include labels that provide links to various location based services defined by text based data that resides on a server separate from the map database server.

In operation, the server 114 may transmit map data to respective display devices 116-122 in chunks of data defined by map data tiles. For example, to transmit the map data needed to construct the map display 300a, of FIG. 3A, the server 114 may transmit each map data tile 302a-318a in a separate frame, each frame having a header portion providing frame identification data (such as geographic position, display device address, map data tile version number, etc.) and a payload portion containing the specific map data to be used in generating a display. Map data tiles provide an effective mechanism for quantizing map data stored in the map database 112 and for quantizing communication of the map data communicated over the network 125 to the display devices 116-122. In other implementations, however, the server 114 may transmit map data to a display device without organizing the map data according to map data tiles.

A display device, such as the display device 118, may store instructions for one or several software applications on a computer-readable medium (e.g., the memory 132a). When executed by one or more processors (e.g., the processor 130), the instructions may provide an interactive user interface (e.g., via the interface device 134) to a user, request and process map data from low-speed (e.g., the memories 132a, 132b, 132c) and high-speed memories, interact with remote devices (e.g., via the network device 136), and perform other functions related to rendering maps on the corresponding display device. The software application may be a stand-alone application dedicated exclusively to rendering maps or an application that serves another purpose but supports interactive map rendering functionality. For example, the software application may be a web browser.

Figure 2:
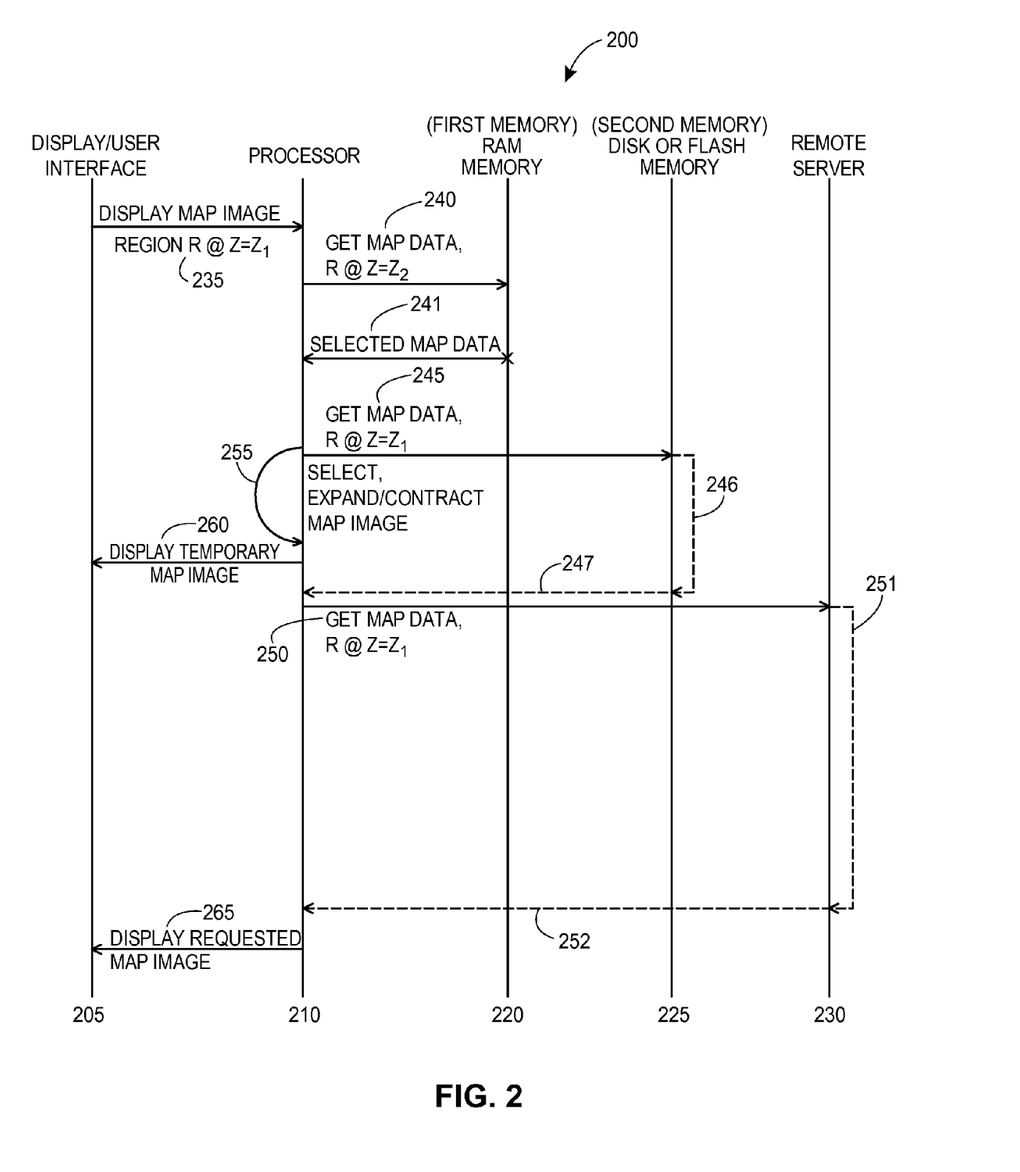
FIG. 2 depicts a message diagram for request and display of map images for a display device.

Operation of a display device that provides a user with an experience of smooth transition between displayed map images is described in connection with the message sequence diagram 200 of FIG. 2. The message sequence diagram 200 illustrates an example sequence of events that may occur from the point in time when a user of one of the display devices 116-122 depicted in FIG. 1 requests updated map data via a display/user interface 205 to the point in time that a display is generated using the updated map data via message 265. For clarity, operations of a map application are depicted on a timeline of a processor 210, and operations of a user interface 205 are depicted on a depicted on a separate timeline. However, it is noted that the user interface 205 in many cases is provided by the map application. FIG. 2 also depicts respective timelines of a first (high speed) memory 220, a second (low-speed) memory 225, and a remote server 230.

A user initiates a request via the display/user interface 205 for display of a map image covering a region (R) at zoom level ($Z=Z_1$) communicated via message 235 to the processor 210. The processor 210, in turn, may determine that map data necessary for generating the requested map image is unavailable in the high speed memory 220 (to this end, the processor 210 also may interact with the high speed memory 220, but interaction is omitted from FIG. 2 for simplicity). The processor 210 further may determine that map data for displaying a map image that includes the region R at a lower zoom level $Z_2$ is available in the high speed memory 220, and request this map data from the high speed memory 220 via message 245. The high speed memory 220 in this scenario provides the map data to the processor 210 via message 241.

The available map data may not provide the desired level of detail or the desired image quality. For example, the available map data may be a raster image. Nevertheless, to avoid displaying grey or blank spaces while the necessary map data is being obtained, the processor 210 may utilize the available map data to generate a temporary map image (event 255). If the available map data is a raster image of region R' encompassing the region R, the processor 210 may expand or otherwise modify the pixels in the raster image of the region R' corresponding to the region R. By way of a more specific example, the zoom level $Z_1$ may be associated with four times the magnification at the zoom level $Z_2$, and the processor 210 accordingly may generate the temporary map image by expanding each pixel in the appropriate portion of the available raster map image to a corresponding a four-by-four square of pixels (i.e., make 16 copies of the pixels and arrange the copies in a square).

In some cases, the available map data includes image data, in a raster format or another suitable format, as well as label data. The label data may be stored in an ASCII, Unicode, or another format that specifies characters using codes rather than images. If label data is available, the processor 210 may render the label data for the region R without any loss to label quality. In other words, the labels available for the region R need not appear blurry. However, in many cases, the available map data will not include labels associated with the zoom level $Z_1$. The available map data, for example, may only include labels for cities and interstate highways visible at zoom level $Z_2$ and not include labels for streets visible at zoom level $Z_1$.

Thus, in at least some of the implementations, the complexity of operations required to process the event 255 is very low, so that the temporary map image can be generated very quickly. With continued reference to FIG. 2, the temporary map image is then provided to the user via the user interface 205 (message 260).

The processor 210 requests the map data for rendering the originally requested map image from the low speed memory 225 via message 245, at approximately at the same time as generating the event 255. In the example scenario illustrated in FIG. 2, the low speed memory 225 provides response 247 to report that the requested map data is not available in the low speed memory 225. However, in some cases, the low speed memory 225 may provide the requested map data in a raster format, a vector graphics format, or any suitable format. In either cases, as illustrated by dashed line 246, interactions between the processor 210 and the low speed memory 225 are generally slow. In another implementation, the processor 210 checks a data structure stored in the high speed memory 220 to determine whether the map data for rendering the originally requested map image is available in the low speed memory 225, prior to generating the message 245. If the processor 210 determines that the map data is unavailable in the low speed memory 225, the processor 210 in this implementation directly proceeds to generating a request for the map data from the server 230.

With continued reference to FIG. 2, the processor 210 requests map data for rendering the requested map image from the remote server 230 via message 250. The remote server 230 may provide the requested map data via a response 252, typically after a relatively long delay (illustrated using a dashed line 251). In some embodiments, the requested map data is provided in a vector graphics format that requires processing to render a map image in a raster format. Generally speaking, vector-based map data specifies various geometric shapes using mathematical descriptions of points and paths connecting the points, and indicates how these shapes should be positioned for rendering various map elements such as roads, buildings, parks, bodies of water, etc. For example, rather than specifying each pixel that makes up a raster image of a line segment, a vector-based description of the line segment may specify the two endpoints of the line segment and indicate that the two endpoints are connected by a straight line. In other embodiments, however, the requested map data is provided in a raster format that does not require further rasterizing.

In the scenario of FIG. 2, the requested map data is received in the response 252 and, in some cases, rasterized or otherwise processed to generate a map image. The map image then is provided to the user via the user interface 205 (message 265). At this time, the user interface 205 also stops displaying the temporary map image provided earlier via the message 260. As a result, the user may first observe a somewhat blurry image while the temporary map image is displayed, and then observe a sharp image once the temporary map image is replaced with the image generated using the requested map data.

From the foregoing, it is noted that the delay associated with using map data from either the display device low speed memory of the remote server is due to one or both primary factors. The first factor is associated with the data access speed, especially with regard to the remote server where the speed and availability of the associated network will induce delay. The second factor is associated with the format of the data stored in the display device low speed memory and the remote server compared to the format of the data stored in a low speed memory. For reasons discussed above, retrieval of the requested map data may take a period of time even when map data is stored in a display device low speed memory, let alone when the desired map data is only available from a remote server and the associated communications network is unavailable. Generating a temporary display using map data stored in the display device high speed memory avoids grey spaces that would otherwise be displayed while the display device is executing the user request for updated map data.

When a requested map image includes sixteen(16) $Z_n$ map data tiles, a temporary display may be generated using one(1) or two(2) $Z_{(n-2)}$ map data tiles, for example. In circumstances where the $Z_{(n-2)}$ map data tiles are not available in a high speed memory, retrieving one(1) or two(2) lower-detail (e.g. lower zoom level) map data tiles from a low speed memory is faster than retrieving all sixteen(16) $Z_n$ map data tiles. In such cases, the message 241 of FIG. 2, generated in response to the message 240 will indicate that the $Z_{(n-2)}$ map data tiles are not available in the high speed memory. The $Z_{(n-2)}$ map data tiles are then retrieved from a low speed memory and used to generate a temporary display. The requested $Z_n$ map data tiles are then retrieved from the low speed memory and used to generate the requested map image display. It should be understood that map data generally may be retrieved in a similar fashion and that the use of map data tiles provides one specific example.

Figure 3A:
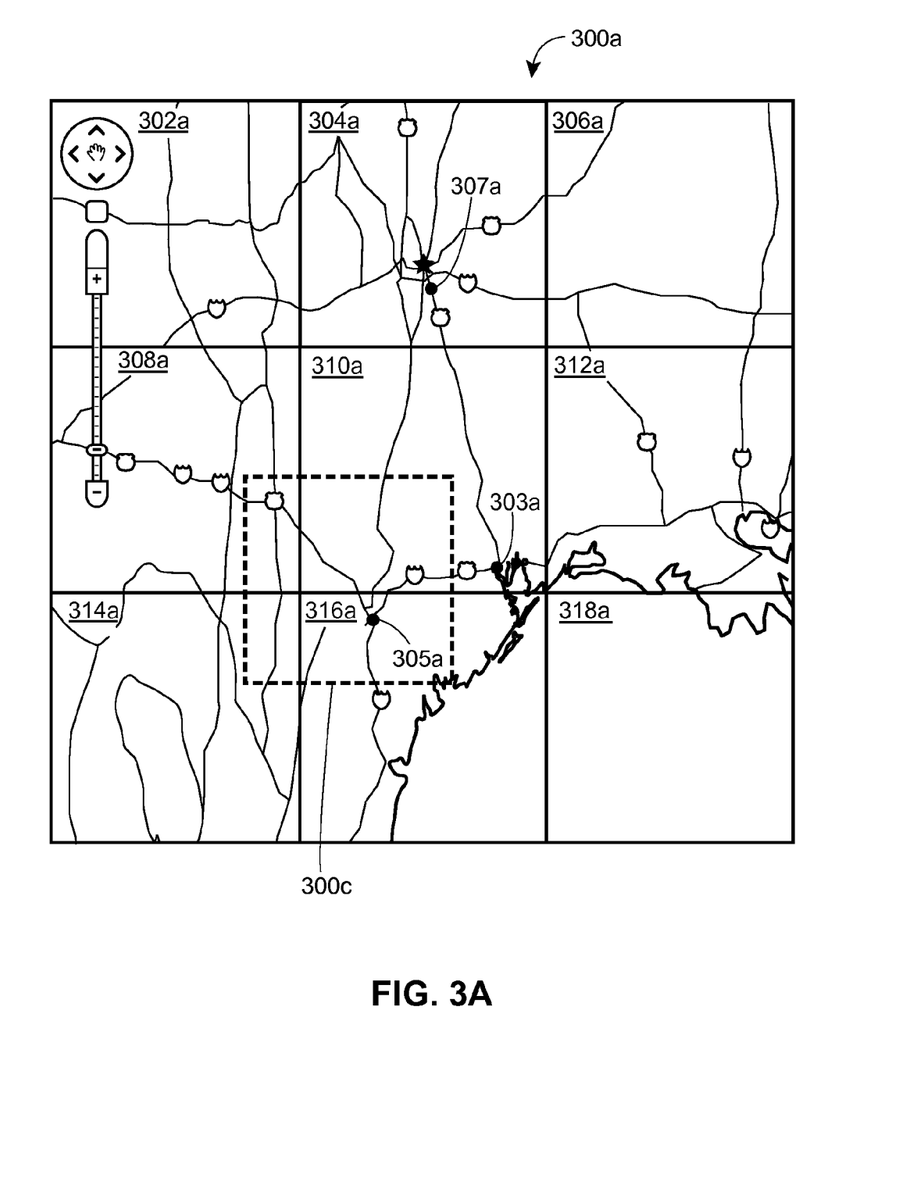
FIGS. 3A, 3B and 3C illustrate example displays of map images at three different zoom levels.
Figure 3B:
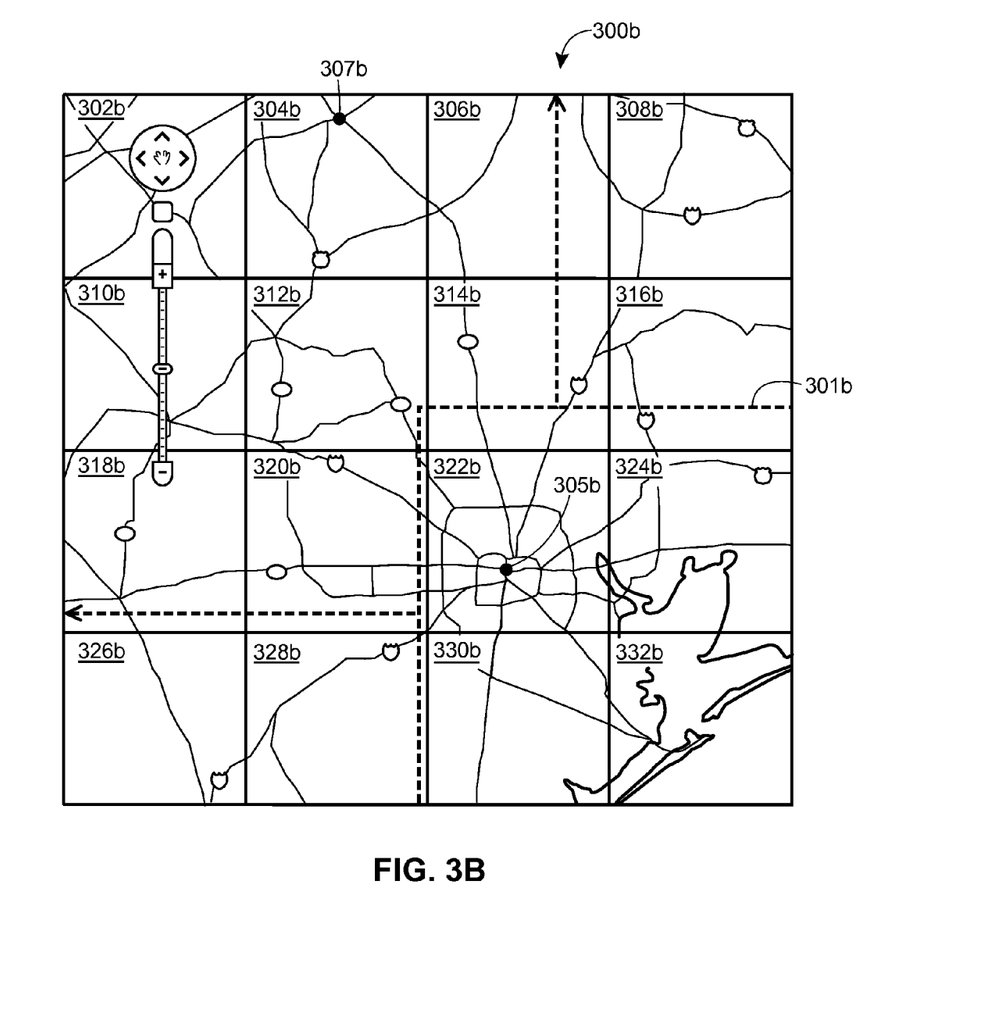
Figure 3C:
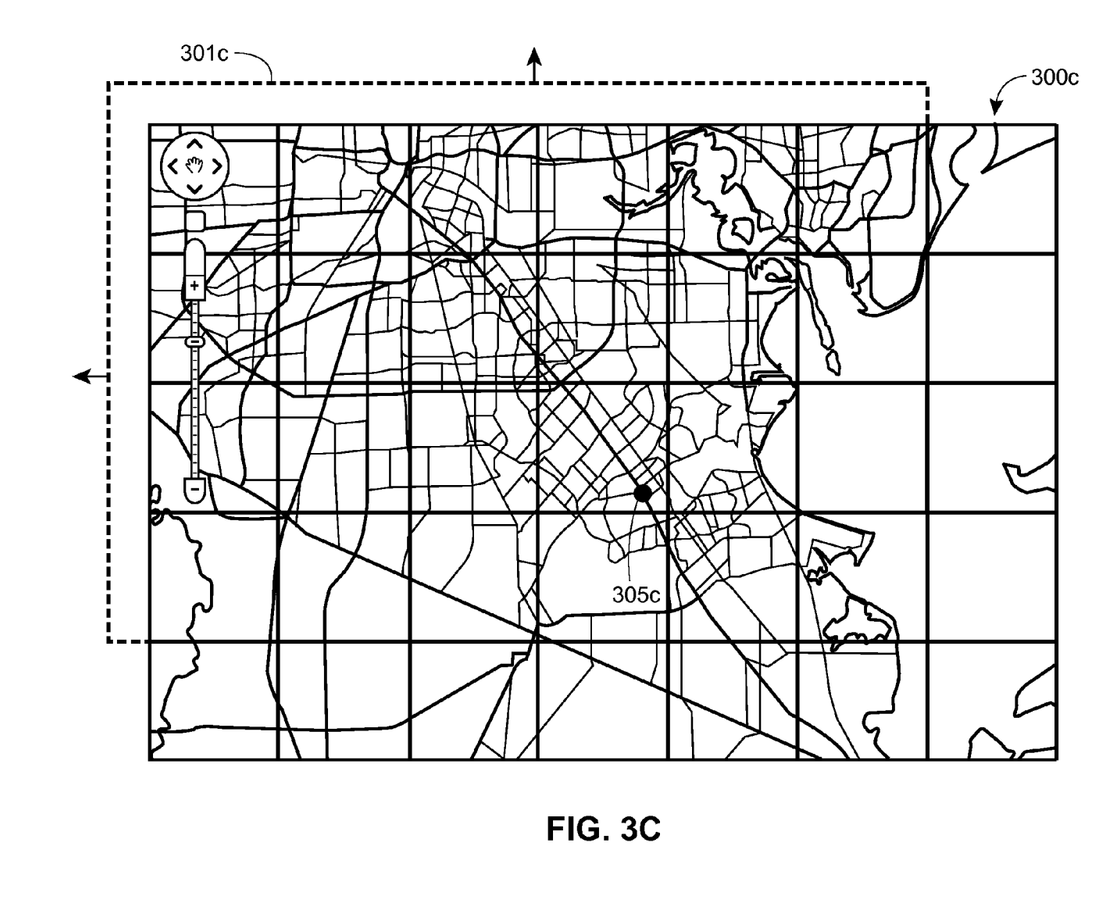

In the illustrated embodiment of FIGS. 3A-3C, the map data is transmitted in map data tiles, and each map data tile, associated with a given zoom level, is allocated the same amount of memory. For example, each map data tile 302a-318a of FIG. 3A may be a rasterized image 10 Kbytes in size when stored in a high speed memory. This may be achieved, for example, by having each map data tile cover the same sized geographic area. Alternatively, each map data tile within a given zoom level may have different memory space allocations. The number of map data tiles at each zoom level increases, e.g., linearly, quadratically, exponentially, or otherwise. The zoom levels in the illustrated example of FIG. 3A-3C (z=10, 12, and 14) have 9, 16, and 35 map data tiles, respectively. The geographic region represented by the map image display 300a of FIG. 3A includes three points of interest 303a, 305a, 307a. The geographic region represented by the map image display 300b includes two points of interest 305b, 307b. The geographic region represented by the map image display 300c includes one point of interest 305c. In comparison to FIG. 3A, FIG. 3B illustrates a visual map display 300b at a zoom level higher than the zoom level of FIG. 3A, in this example zoom level, z=12. The map display 300b is formed of sixteen map data tiles 302b-332b. Like the map data tiles 302a-318a of FIG. 3A, the map data tiles 302b-332b of FIG. 3B are each the same in size, e.g., covering the same geographic area and having the same memory size. FIG. 3C illustrates another map image display 300c at a third even higher zoom level, zoom level z=14, formed of thirty-five individual map data tiles. Each of the map image displays 300a, 300b, and 300c depict only a portion of the overall map data available from a remote server, which is capable of providing many more map data tiles than those depicted. As illustrated across FIGS. 3A-3C, the map data tiles that form each map image display have various levels of detail. The map data tiles 302a-318a of FIG. 3A illustrate geographic boundaries, but no local roads, only highways and/or interstates, while the map data tiles of FIG. 3B are at a higher zoom level and contain information on local roads. The map data tiles of FIG. 3C illustrate even more detail.

In operation of a map application, a user may initially request a map image display 300a (FIG. 3A) including the points of interest 303a, 305a, 307a. The user may request a map image display 300b via a zoom control feature to depict more detail related to the point of interest 305b (FIG. 3B), for example. The geographic region corresponding to the map image display 300b is illustrated in the map image display 300a as being enclosed by dashed lines. Subsequently, the user may request a map image display 300c once again via the zoom control feature to depict even more detail related to the point of interest 305c. The user may then request a map image display 301c via a pan control feature such that another point of interest (i.e. point of interest 305b, for example) will be within the geographic region being displayed. As can be seen from viewing FIG. 3C, eleven additional map data tiles are required at zoom level 14 to generate the requested map image display. The systems and methods of the present disclosure will have stored the map data associated with the map image display 300b in a high speed memory when the map image display 300b was being viewed. While the display device is executing the user request for map image display 301c, a temporary display will be generated using the map data associated with the region 301b depicted in FIG. 3B. As represented by the dashed lines and dashed arrows, the map display image 301b is expanded to fit the overall display area with the point of interest 305b included.

Figure 4:
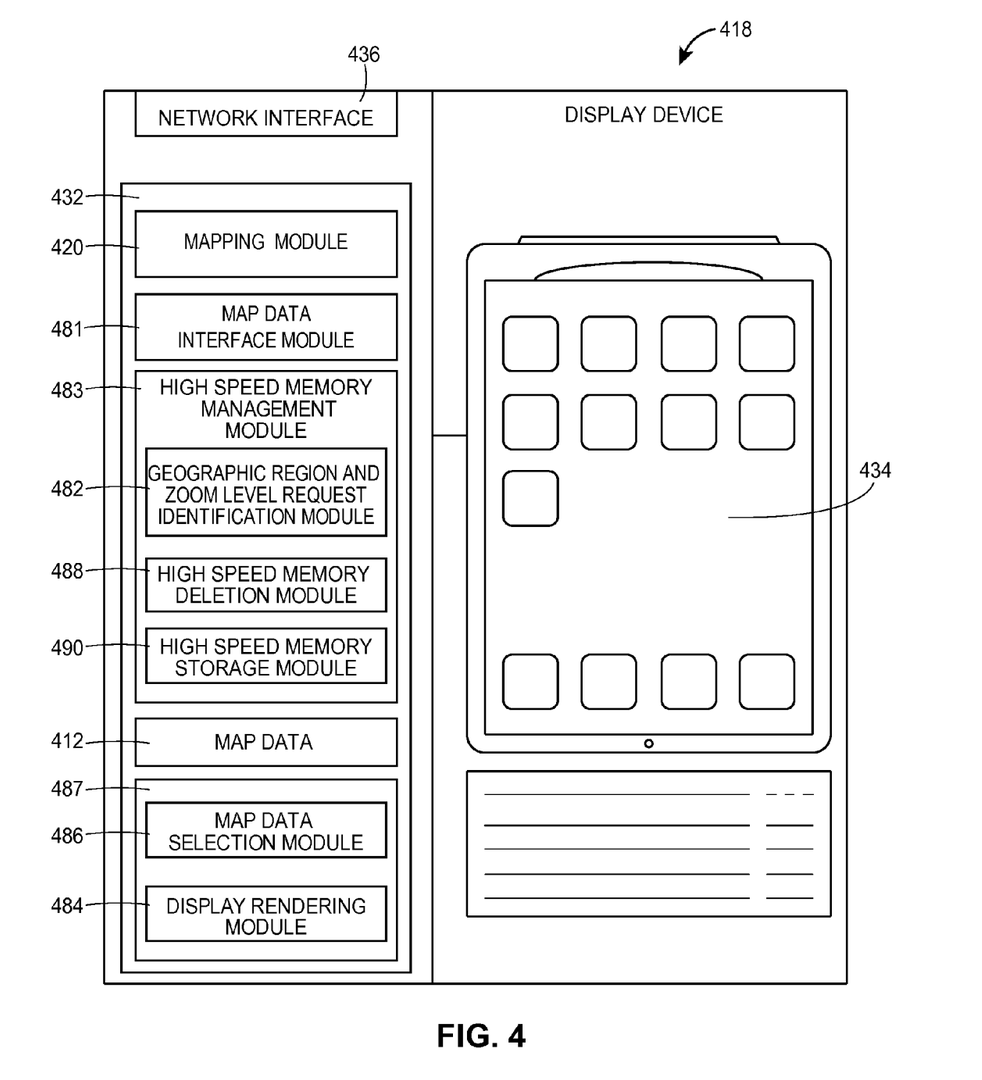
FIG. 4 depicts a block diagram of an example display device.

With reference to FIG. 4, display device 418 including a mapping application 420 stored on the persistent memory 432 may be utilized to implement the messages depicted and described with regard to FIG. 2 and the function as described with regard to FIGS. 3A-3C. The mapping application 420 is executed to manipulate the visual display in response to user interaction with the user interface 434. For example, the mapping application 420 may adjust the display of map data in response to a user selecting to pan (left, right, up, down, etc.) through the user interface 434, or in response to the user selecting to change the zoom level of the displayed map image. A map data interface module 481 operates to retrieve map data from the persistent memory 432 of the display device 418 or from a remote server via the network interface 436. The display device 418 further includes a high speed memory management module 483 that, in the illustrated embodiment, includes a map point(s) or region identification module 482 capable of identifying a region or one or more points of interest that are to be conveyed to a display rendering module 484 to render a visual map display using the received map data. The points of interest are communicated by the map data interface module 481 through the network interface 436 to a remote server, which responds by sending the requested map data back to the display device 418, where this map data is received by the map data interface module 481. The map data 412 is stored in the low speed (in this case, persistent) memory 432 of the display device 418 and subsequently stored in a high speed memory via the high speed memory management module 483 of the display device 418. A map data selection module 486 accesses the map data stored in the display device high speed memory and determines which portion of the map data is to be provided to the display module 484 for rendering a temporary display on the interface 434. The map data selection and display rendering module 487 is responsive to user interaction with the interface 434 to determine which portion of the map data the user desires to display on the display device 418 at any given time. The high speed memory management module 483 further includes a high speed memory storage module 490 that identifies the map data to be stored in the display device high speed memory. The map data interface module 481 receives the map data and stores the map data in the high speed memory of the display device for future display using the map data selection and display rendering module 487.

In the illustrated embodiment of FIG. 4, the display device 418 further includes a high speed memory deletion module 488 that cooperates with the high speed memory storage module 490 to determine when map data is to be deleted from the display device high speed memory. The display device 418, for example, receives map data via the map data interface module 481, where upon receipt of one or any predetermined amount of map data, the high speed memory storage module 490 determines if the received map data is more recently used, or more frequently used, for example, than the map data tiles currently stored on the display device.

The map data 412 may contain map data stored in a rasterized format, for display using a raster display engine executed by the display rendering module 484. Alternatively, the map data 412 may contain map data stored in a vector graphics format, for display using a vector buildup display engine executed by the display rendering module 484. A display device 418 may have different and/or other modules than the ones described herein. Similarly, the functions described herein may be distributed among the modules in a different manner than that described herein.

Figure 5:
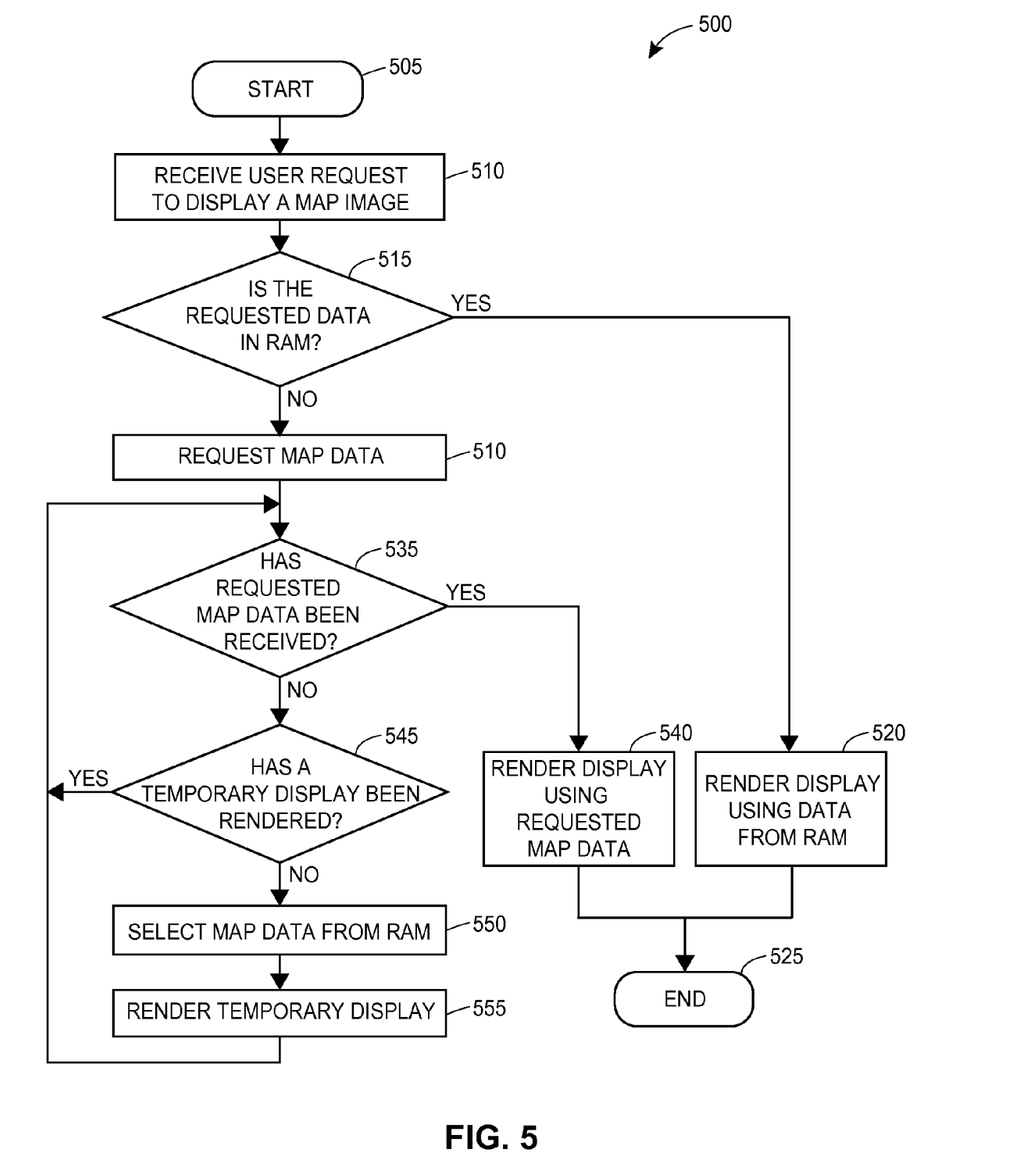
FIG. 5 depicts a flow chart for a map data set selection and display rendering routine.

Turning now to FIG. 5, there is shown a map data selection and display rendering module 500 flow chart that may be implemented by the display device 418 as illustrated in FIG. 5 or any of the display devices 116-122 of FIG. 1. Initiation of the digital image data selection and display rendering module 500 is performed in start block 505. A user request for display of a map image associated with updated map data is processed in block 510 followed by decision block 515 where a check is performed to decide whether or not the updated map data is currently stored in a high speed memory of the display device. If the requested, updated data is available in the high speed memory, a display is rendered in block 520 using the map data available from high speed memory before the map data selection and display rendering module 500 is terminated in end block 525. Although it is unlikely that the exact map data requested by a user will be stored in the display device high speed memory, this scenario may occur when a user of the given display device has previously viewed a map image associated with the map data.

When the user requested updated data is not currently stored in the high speed memory of the display device, the display device performs a request for the map data from a display device persistent memory in block 530. If the requested map data is not available from the display device low speed memory, the map data is requested from a remote database. A check is made in block 535 to determine whether or not the display device has received the requested updated map data. If the requested updated map data has been received, a display is rendered in block 540 using the updated map data before the module is terminated in end block 525. If the requested updated map data has not yet been received, a check is made in block 545 to determine if a temporary display was previously rendered. If a temporary display was previously rendered, the sequence returns to block 535. If a temporary display was not previously rendered, a determination is made in block 550 as to what map data currently stored in the display device high speed memory to select and a temporary display is rendered in block 555 using the selected map data. The display device may be configured to select map data from the high speed memory that encompasses the requested map data and having an associated zoom level that is closest to the requested zoom level from the map data available in the high speed memory.

When a requested map image includes sixteen(16) $Z_n$ map data tiles, a temporary display may be generated using one(1) or two(2) $Z_{(n-2)}$ map data tiles, for example. In circumstances where the $Z_{(n-2)}$ map data tiles are not available in a high speed memory, retrieving one(1) or two(2) lower-detail (e.g. lower zoom level) map data tiles from a low speed memory is faster than retrieving all sixteen(16) $Z_n$ map data tiles. In such cases, the $Z_{(n-2)}$ map data tiles are retrieved from a low speed memory in block 550 and used to generate a temporary display in block 555. When the $Z_n$ map data tiles requested in block 510 are retrieved from the low speed memory or from the remote server, the requested $Z_n$ map data tiles are used to generate the requested map image display in block 540. It should be understood that map data generally may be retrieved in a similar fashion and that the use of map data tiles provides one specific example.

The digital image data is stored in the display device high speed memory with a pre-processed data structure. For example, the digital image data may be stored in the high speed memory in a rasterized, or partially rasterized, structure. The combination of the high speed memory architecture and the pre-processed data structure enable rendering a temporary display using the digital image data from high speed memory such that no blank or grey spaces appear in the display. In some implementations, map data stored in the display device persistent memory or in a remote database is in a format that requires more processing to render a display (e.g. vector data format) than compared to the map data stored in a display device high speed memory. The combination of faster data access speed associated with the display device high speed memory and the format of the data stored in the display device results in a display being rendered in less time than when the map data is obtained from either a client device low speed memory or from a remote map database.

In addition to the systems and methods for temporarily displaying map data stored in a display device high speed memory, the present disclosure describes systems and methods for selectively storing a subset, or subsets of the entire map data available on remote servers. The subset, or subsets of map data are stored in the display device high speed memory by selectively identifying one or more points of interest or region, where those points of interest or region are uniquely associated with a given display device. The map data stored in the display device high speed memory is then available to render a display during subsequent execution of user requests for updated map data. Alternatively, the points of interest or region may be automatically determined by the display device. In either case, the points of interest or region are identified to a map data interface module that retrieves corresponding map data from either the display device low speed (e.g., persistent) memory or a remote map database including map data for the points of interest or region and corresponding to the desired zoom level.

The content of a display device high speed memory may be controlled by a high speed memory management module, for example, executed on the display device. It should be understood that the high speed memory management module described herein represents one example of many alternatives for managing the content of a display device high speed memory. When a user requests a display of a map image, a check may be performed to decide whether or not the associated map data is more recently, or frequently used than the least used data currently stored in the high speed memory. If the requested updated data is more recently, or frequently used, a check may be made to determine if the amount of data currently stored in high speed memory is at a limit. If the high speed memory limit has been reached, the least used data is deleted from the high speed memory before the requested updated data is stored in high speed memory. A high speed memory management module may be configured such that a user enables the display device to "listen" for the display device GPS location when a mapping application is executed and automatically store map data corresponding to the display device location in the display device high speed memory. A high speed memory management module may store map data based upon recent user searches. A high speed memory management module may include a menu option that allows a user to determine the map data that is stored in high speed memory.

As one example of the presently described systems and methods, a set of map data associated with a view of the entire earth may be stored in a high speed memory of a display device at a low zoom level having relatively few features and little detail. This map data may be referred in this disclosure as "wide area map data." Thereby, no matter what point(s) of interest or region of interest a user identifies in a request for updated map data, the point(s) of interest or region will be within the map data tiles available in the display device high speed memory. Even though the map data stored in the display device high speed memory at any given time will not likely be identical to the map data that will ultimately be retrieved from the display device persistent memory or a remote map database, map data stored in the display device high speed memory will be utilized to render a temporary display. The temporary display is maintained until the updated map data is received. When the user initiated request for updated map data is complete, the temporary display is replaced using the updated map data. Any portion of a temporary display associated with any given map data tile, may be updated as the individual requested map data tiles are received.

Although the data size associated with lower-detail (e.g. low zoom level) map data tiles is often smaller with respect to the data size associated with higher-detail (e.g. high zoom level) map data tiles, this is not always the case. The data size associated with the lower-detail (e.g. low zoom level) map data tiles may be the same as the data size associated with higher-detail (e.g. high zoom level) map data tiles. Often times, the geographic area associated with one(1) $Z_n$ map data tile covers the geographic area of four(4) $Z_{(n+1)}$ map data tiles. It should be understood that the geographic area associated with one(1) $Z_n$ map data tile may cover more than the geographic area of four(4) $Z_{(n+1)}$ map data tiles. When a requested map image includes sixteen(16) $Z_n$ map data tiles, a temporary display may be generated using one(1) or two(2) $Z_{(n-2)}$ map data tiles, for example. In circumstances where the $Z_{(n-2)}$ map data tiles are not available in a high speed memory, retrieving one(1) or two(2) lower-detail (e.g. lower zoom level) map data tiles from a low speed memory is faster than retrieving all sixteen(16) $Z_n$ map data tiles. A group of lower-detail (e.g. lower zoom level) map data tiles may be stored in a high speed memory for use in generating a temporary display. The group of lower-detail (e.g. lower zoom level) map data tiles stored in the high speed memory at any given time may be based on the map data tiles included in a current map image display. A geographic area associated with a subsequent map image display is often near a geographic area of a current map image display.

As the zoom levels increase (i.e., as the map display focuses down on a smaller geographic region) the amount of map data may reach a maximum point, beyond which all zoom levels will contain the same map data. The number of map data tiles needed to render a desired display may vary, however, the total amount of map data within any given map data tile becomes saturated (i.e. no additional features are available in subsequent zoom levels). Any additional zoom levels selected by the user merely zoom in further on the features included in the lower, saturated zoom levels. In the illustrated example of FIGS. 3A-3C, zoom level, z=12 of FIG. 3B, represents the saturation zoom level. In one example, map data associated with the saturation zoom level is stored in a display device high speed memory for use in generating a temporary display.

In operation, the size of the high speed memory made available for storage of map data may be based upon the amount of high speed memory free space. A "high speed memory options" option may be provided in a mapping application menu to allow a user the ability to turn on, or turn off execution of a corresponding high speed memory management module. A high speed memory management module— may allow a user an option to clear the high speed memory. The size of the high speed memory made available for storing map data may be scaled back when a user clears the high speed memory often.

A map data selection module 486 as depicted and described with reference to FIG. 4 may use map data stored in high speed memory that encompasses corresponding point(s) of interest that would not fill the entire display if scaled as originally intended by "expanding", "contracting" or rescaling the available map data as depicted with reference to display 301c. Thereby, a temporary display may be rendered using the map data stored in high speed memory even though the map data stored in high speed memory does not exactly match the user requested map data and avoid display of blank or grey spaces.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of components, modules, or mechanisms. Modules may constitute either software modules or hardware modules. A hardware module is tangible unit capable of performing certain operations and may be configured or arranged in a certain manner. In example embodiments, one or more computer systems (e.g., a standalone, display or server computer system) or one or more hardware modules of a computer system (e.g., a processor or a group of processors) may be configured by software (e.g., an application or application portion) as a hardware module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods, modules and routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map editor system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a method for selecting map data stored in a display device high speed memory and rendering a temporary display using the selected map data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for displaying maps on a display device, the display device having a first memory, a second memory and a user interface, wherein a first access speed of the first memory is higher than a second access speed of the second memory, and wherein the display device operates in a communication network, the method comprising:

receiving a user request via the user interface to display a requested map image corresponding to a requested geographic region and a requested zoom level;

determining that map data required to generate the requested map image is unavailable in the first memory;

generating a temporary display of a selected map image in response to determining that the required map data is unavailable in the first memory, comprising:

selecting, from the first memory, map data made up of pixels, wherein the map data defines a selected map image corresponding to a selected geographic region and a selected zoom level, wherein the selected geographic region encompasses the requested geographic region, and wherein the selected zoom level corresponds to lower magnification than the requested zoom level; and generating the temporary display of the selected map image using the selected map data, including expanding the selected map image to match the requested zoom level;

retrieving the map data required to generate a display of the requested map image from the second memory, in response to the user request, wherein the map data is retrieved into the second memory from the remote server operating in the communication network; and displaying the temporary display on the user interface at least while the map data required to generate a display of the requested map image is being retrieved.

2. A method for displaying maps on a display device as in claim 1 wherein the first memory is a volatile memory and the second memory is a non-volatile memory.

3. A method for displaying maps on a display device as in claim 1 wherein determining that map data required to generate the requested map image is unavailable in the first memory includes determining that some but less than all of the required map data is in the first memory.

4. A method for displaying maps on a display device as in claim 1 wherein the required map data is stored in the second memory.

5. A method for displaying maps on a display device as in claim 1, further comprising:
receiving the required map data from the remote server; and
interpreting the vector based data at the display device to generate the requested map image.

6. The method of claim 1, wherein expanding the selected map image includes:
expanding each of the pixels in the corresponding map data to a four-by-four square of pixels when the requested zoom level and the selected zoom level are one discrete zoom level apart.

7. A display device for displaying maps, the display device having a first memory, a second memory and a user interface, wherein a first access speed of the first memory is higher than a second access speed of the second memory, and wherein the display device operates in a communication network, the display device comprising:
a mapping module stored on the second memory that, when executed on a processor receives a user request via the user interface to display a requested map image corresponding to a requested geographic region and a requested zoom level;
a map data selection and display rendering module stored on the second memory that, when executed on a processor determines that map data required to generate the requested map image is unavailable in the first memory;
the map data selection and display rendering module generates a temporary display of a selected map image in response to determining that the required map data is unavailable in the first memory, comprising:
the map data selection and display rendering module selects, from the first memory, map data made up of pixels, wherein the map data defines a selected map image corresponding to a selected geographic region and a selected zoom level, wherein the selected geographic region encompasses the requested geographic region and wherein the selected zoom level corresponds to lower magnification than the requested zoom level; and
the map data selection and display rendering module expands the selected map image to match the requested zoom level to generate the temporary display of the selected map image;
a map data interface module stored on the second memory that, when executed on a processor retrieves the map data required to generate a display of the requested map image from the second memory, in response to the user request, wherein the map data is retrieved into the second memory from the remote server operating in the communication network; and
the map data selection and display rendering module displays the temporary display on the user interface at least while the map data required to generate a display of the requested map image is being retrieved.

8. A display device for displaying maps as in claim 7 wherein the first memory is a volatile memory and the second memory is a non-volatile memory.

9. A display device for displaying maps as in claim 7 wherein to determine that map data required to generate the requested map image is unavailable in the first memory, the map data selection and display rendering module determines that some but less than all of the required map data is in the first memory.

10. A display device for displaying maps as in claim 7, wherein the map data selection and display rendering module receives the required map data from the remote server and interprets the vector based data to generate the requested map image.

11. A display device for displaying maps as in claim 7, wherein the map data selection and display rendering module causes wide area map data representative of an image of a large geographic area to be stored in the first memory, wherein the large geographic areas encompasses all geographic areas to which subsequent user requests to display map images correspond and wherein the selected map data is selected from the wide area map data.

12. A display device for displaying maps as in claim 7 wherein the user request is communicated via a pan control feature.

13. A display device for displaying maps as in claim 7, wherein to expand the selected map image, the map data selection and display rendering module expands each of the pixels in the corresponding map data to a four-by-four square of pixels when the requested zoom level and the selected zoom level are one discrete zoom level apart.

14. A non-transitory computer-readable medium storing instructions for displaying maps on a display device, the display device having a first memory, a second memory and a user interface, wherein a first access speed of the first memory is higher than a second access speed of the second memory, and wherein the display device operates in a communication network, the computer-readable medium comprising:
a mapping module stored on the computer-readable medium that, when executed on a processor receives a user request via the user interface to display a requested map image corresponding to a requested geographic region and a requested zoom level;
a map data selection and display rendering module stored on the computer-readable medium that, when executed on a processor determines that map data required to generate the requested map image is unavailable in the first memory;
the map data selection and display rendering module generates a temporary display of a selected map image in response to determining that the required map data is unavailable in the first memory, comprising:
the map data selection and display rendering module selects, from the first memory, map data made up of pixels, wherein the map data defines a selected map image corresponding to a selected geographic region and a selected zoom level, wherein the selected geographic region encompasses the requested geographic region and wherein the selected zoom level corresponds to lower magnification than the requested zoom level; and
the map data selection and display rendering module expands the selected map image to match the requested zoom level to generate the temporary display of the selected map image;

a map data interface module stored on the computer-readable medium that, when executed on a processor retrieves the map data required to generate a display of the requested map image from the second memory in response to the user request, wherein the map data is retrieved into the second memory from the remote server operating in the communication network; and the map data selection and display rendering module displays the temporary display on the user interface at least while the map data required to generate a display of the requested map image is being retrieved.

15. A non-transitory computer-readable medium as in claim 14 wherein the first memory is a volatile memory and the second memory is a non-volatile memory.

16. A non-transitory computer-readable medium as in claim 14 wherein to determine that map data required to generate the requested map image is unavailable in the first memory, the map data selection and display rendering module determines that some but less than all of the required map data is in the first memory.

17. A non-transitory computer-readable medium as in claim 16 wherein to generate the temporary display of the selected map image using the selected map data, the map data selection and display rendering module rescales a map image associated with the selected map data and generating a display representative of the rescaled map image.

18. A non-transitory computer-readable medium as in claim 14 wherein the required map data is stored in the second memory.

19. A non-transitory computer-readable medium as in claim 14, wherein to expand the selected map image, the map data selection and display rendering module expands each of the pixels in the corresponding map data to a four-by-four square of pixels when the requested zoom level and the selected zoom level are one discrete zoom level apart.

\* \* \* \* \*